United States Patent [19]
Hoh et al.

[11] Patent Number: 5,621,632
[45] Date of Patent: Apr. 15, 1997

[54] SWITCH MODE POWER SUPPLY CIRCUIT

[75] Inventors: Kian P. Hoh; Chun H. Wu, both of Singapore, Singapore

[73] Assignee: Thomson Consumer Electronics, S.A., Courbevoie, France

[21] Appl. No.: 316,493

[22] Filed: Sep. 30, 1994

[30] Foreign Application Priority Data

Oct. 20, 1993 [GB] United Kingdom ............... 9321583

[51] Int. Cl.⁶ .................................................. H02M 7/5375
[52] U.S. Cl. ........................ 363/97; 363/21; 363/49
[58] Field of Search ............................ 363/20, 21, 97, 363/49; 307/44, 48, 66, 126; 364/492, 493; 323/289

[56] References Cited

U.S. PATENT DOCUMENTS

| | | | |
|---|---|---|---|
| 4,058,738 | 11/1977 | Udvardi-Lakos | 307/66 |
| 4,429,259 | 1/1984 | Luz | 348/730 |
| 4,679,131 | 7/1987 | Filliman | 363/21 |
| 4,734,771 | 3/1988 | Lendaro et al. | 348/730 |
| 5,291,386 | 3/1994 | Wu | 363/21 |

FOREIGN PATENT DOCUMENTS

| | | |
|---|---|---|
| 2105929 | 3/1983 | United Kingdom. |
| 2257338 | 1/1993 | United Kingdom. |
| 92/17934 | 10/1992 | WIPO. |

Primary Examiner—Peter S. Wong
Assistant Examiner—Y. J. Han
Attorney, Agent, or Firm—Joseph S. Tripoli; Frederick A. Wein

[57] ABSTRACT

In a switch mode power supply of a video apparatus, a capacitor develops a supply voltage that is coupled to a main current conducting electrode of a driver transistor. The driver transistor drives a switching power transistor. An arrangement charges the charging capacitor when the video apparatus operates in standby mode. A delay circuit introduces a delay time between a time when the capacitor begins to be charged and the time when a switching control signal is applied to the driver transistor for operation in a run mode. Consequently, the capacitor develops sufficient voltage that insures sufficient base current to turn on the power transistor in to saturation prior to the time the switching control signal is applied to the driver transistor. Thus, a possible damage to the power transistor is prevented.

10 Claims, 4 Drawing Sheets

SWITCH MODE POWER SUPPLY CIRCUIT

The invention relates to a switch mode power supply (SMPS) used in, for example, television receivers and video recorders.

To ensure that a switching power transistor of a SMPS is fully and not partially turned on, its base current has to be sufficiently large. A charging capacitor that energizes a driver transistor stores charge for supplying at least most of the necessary base current to the power transistor. Hence, the sufficiency of the charge stored in the charging capacitor is important for the reliability of the power supply. Insufficient charge will result in insufficient or partial turning on of the power transistor. With insufficient base current, the power transistor will not operate in the saturation region, resulting in reduced reliability and sometimes immediate destruction.

In some prior art SMPS's, upon turn on of the power supply and before the capacitor is fully charged up, a switching pulse train is developed at the base of the power transistor and causes the power transistor to switch periodically on and off. The base current depends significantly on the stored charges in the charging capacitor. Because the capacitor may not be then fully charged, insufficient stored charge will not provide sufficient base current. During start up, there is no current feed back from a winding of a transformer of the SMPS via a diode that is used in normal operation to provide the necessary base current of the power transistor. Thus, the base current depends mainly on the stored charge in the capacitor.

When a television set is turned on from a STAND-BY mode to a RUN mode, the source of current that charges the charging capacitor may also be coupled via several current paths to energize an oscillator circuit for generating a sawtooth waveform, to energize a micro-controller and to energize other transistors and resistors of the circuit. This extra load further reduces the amount of current available to charge up the charging capacitor of the driver transistor.

In the RUN mode, the base current of the power transistor is mainly supplied by a current feedback from the transformer of the SMPS that is coupled to the capacitor through a diode. However, in the event a protection circuit is activated as a result of a fault condition, there may not be current feedback available via such diode to charge up the charging capacitor.

Typically, when the protection circuit is activated and. consequently, the power supply shuts down, the fault signal disappears. In the absence of the fault signal, the power supply attempts to restart. Once restarted, the fault signal may reappear provided that the fault has not been eliminated in the interim. Consequently, the power supply shuts down again. This process, known as "hiccuping" creates a great stress on components of the power supply and may continue indefinitely until the set is switched off or some major components such as the power transistor are damaged. It may be desirable to ensure that the power transistor is not damaged or that the probability of such damage to the power transistor is reduced.

During the hiccuping process, the charging capacitor may not be fully charged up. In the absence of the aforementioned feedback current via the diode, the only current source to charge the charging capacitor is via, for example, a resistor. However, as mentioned above, due to the several current paths common to the charging path of the charging capacitor, this capacitor may not be sufficiently charged before the fault signal disappears. The pulse train may appear at the collector of the driving transistor and attempt a restart i.e., to turn on the power transistor. As the "hiccuping" continues, the amount of charge accumulated in the charging capacitor depends on the capacitance of the capacitor, the value of a resistor and the interval of "hiccuping". If the capacitance of the charging capacitor is small, the capacitor can be fully charged up. However, disadvantageously, the stored charges will be also small and the capacitor will not be able to provide the base current for a sufficient duration to turn on fully the power transistor. It may be desirable to ensure that under conditions such as switching the set from power OFF to STAND-BY mode, from STAND-BY mode to RUN mode or during repeatedly turning the receiver off and on, as well as during operation of the protection circuit, the power transistor is not partially turned on.

In carrying out an inventive feature, after turning on the power supply from the power OFF mode or from the STAND-BY mode to the normal RUN mode, the charging capacitor is maintained fully charged before the periodic switching voltage appears at the base of the power transistor. A delay is established to allow an additional capacitor having a function that is similar to that of the charging capacitor to charge up fully before the set can be turned on from STAND-BY to RUN mode operation.

In carrying out another inventive feature, the charging capacitor is maintained fully charged up in the STAND-BY mode, instead of having it begin to charge up when the television set is switched on. This ensures that the charging capacitor is fully charged up before the pulse train appears at the collector of the driver transistor and attempts to switch on the power transistor. A larger charging capacitor such as 470 μF may be used by reducing the number of current paths when the capacitor is charged, when no feedback current is provided via the above-mentioned diode. This allows more stored charge and hence ensures sufficient base drive at all times.

In carrying out a further inventive feature, an under voltage protection is provided. This is useful as it prevents any attempt to turn on the power supply when the voltage across the charging capacitor is too low. A low voltage across the charging capacitor indicates insufficient stored charges that may not be able to maintain sufficient base current to drive the power transistor to saturation for sufficiently long turn on interval.

In carrying out an additional inventive feature, a delay is provided when the television set is repeatedly turned on from STAND-BY to RUN mode. A delay is provided when the "hiccuping" process occurs. This delay allows the charging capacitor to be fully charged and enhances the reliability of the power supply. The charging capacitor is maintained charged during STAND-BY mode. Whereas, the current supplied to the driver circuit remains cut off during STAND-BY mode operation. A delay circuit is provided for introducing a delay time between a turning on time of the circuit and the occurrence of the periodic switching voltage at the base of the power transistor. The delay may be applied to a micro-controller that controls the switching of the power transistor to insure that the charging capacitor is fully charged up before the micro-controller is ready to accept user commands.

A switch mode power supply, embodying an aspect of the invention, includes a micro-controller for switching operation of the power supply between a power-off mode, a stand-by mode and a normal run mode. A power transistor has a control electrode responsive to a periodic switching signal for switch mode operation during the normal run mode. A driver stage supplies the periodic switching signal to the control electrode in the normal run mode. A capacitor is coupled to a supply terminal of the driver stage for storing a charge, supplied via a charging path, to generate a supply voltage for energizing the driver stage. After switching of the power supply to the normal run mode, it is ensured that the capacitor is fully charged before the periodic switching control signal appears at the control electrode.

Figure 1:
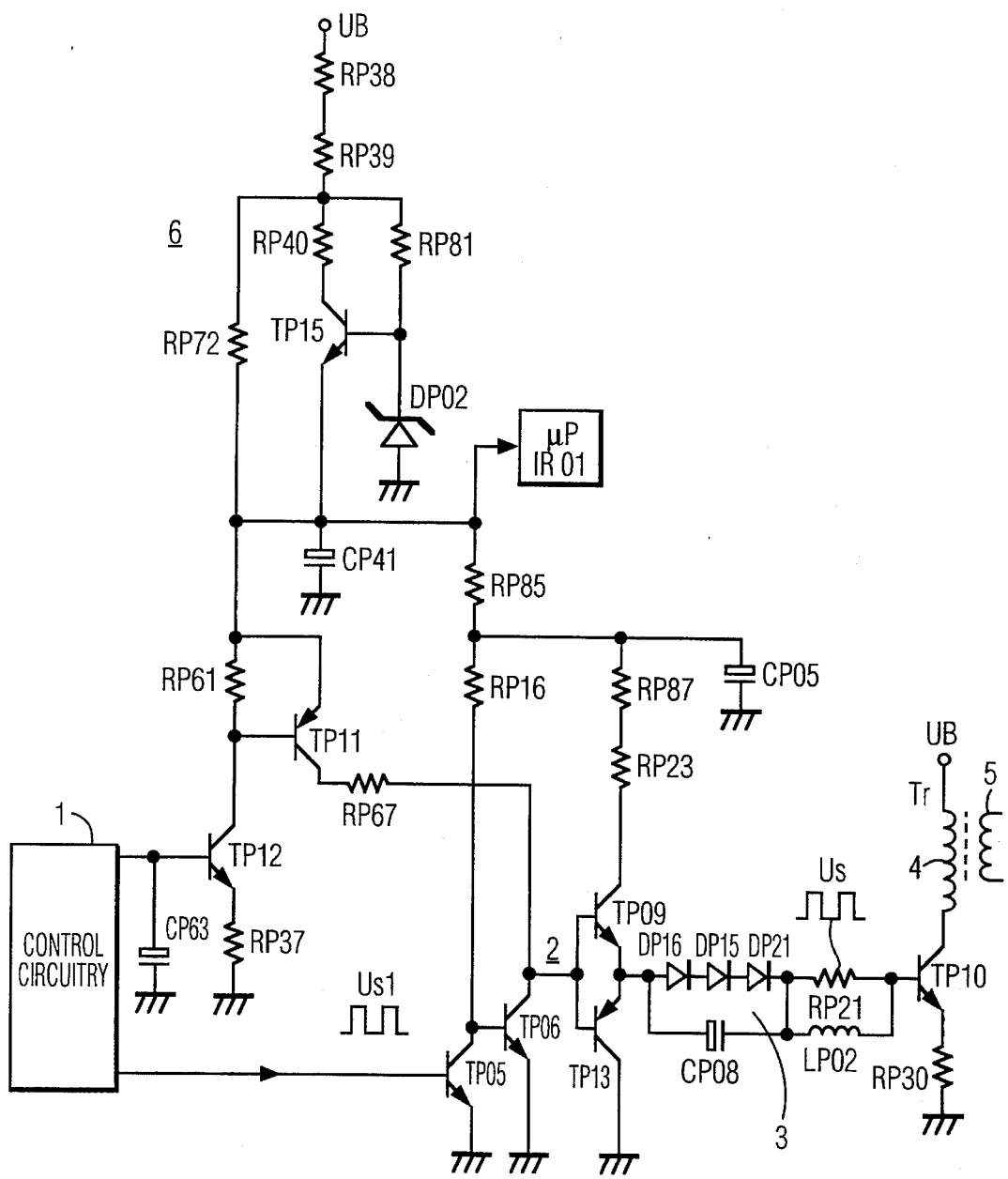
FIG. 1 illustrates a switch mode power supply, embodying an aspect of the invention.

FIG. 1 illustrates a portion of a switch mode power supply circuit (SMPS) including a control circuit 1 for providing a switching voltage US1 which is coupled via a driver stage 2 and a base current generating network 3 to a base of a power transistor TP10. Transistor TP10 is coupled via a primary winding 4 of a transformer Tr to a supply voltage UB. A secondary winding 5 of transformer Tr provides via a rectifier, not shown, an output supply voltage, not shown, in a conventional manner. Typically, several secondary windings such as winding 5 are provided for generating various output supply voltages of different levels and polarities.

Driver stage 2 is energized from a charging capacitor CP05 that is charged via a charging circuit 6 from supply voltage UB. When the television set is plugged into the mains supply voltage, that produces voltage UB in a conventional manner not shown, charging capacitor CP05 charges up via resistors RP38, RP39, RP40 and RP72, via a transistor TP15 and a resistor RP85. Circuit 6 also supplies energizing current to a micro-controller IR01. In addition, circuit 6 generates a current in a resistor RP16 to turn on a transistor TP06. When the television set is at a STAND-BY mode, a transistor TP12 is turned off and no current will flow through a collector resistor RP61. Hence, a transistor TP11 is turned off.

It is necessary to turn on transistor TP06 in order to turn off a transistor TP09 and in order to turn on a transistor TP13. Transistors TP09 and TP13 form a push-pull drive circuit of power transistor TP10. When transistor TP09 is turned off, there is no base current to turn on transistor TP10. Therefore, the power supply is turned off. Thus, current cannot flow via resistors RP87 and RP23, via transistor TP09, diodes DP15, DP16 and DP21 and via an inductor LP02 to turn on transistor TP10. This current path which forms the base drive current for transistor TP10 consumes a large current. By disabling this current path at the STAND-BY mode, most of the current that flows through resistors RP38, RP39, RP40 and RP72 and transistor TP15 is used for charging up a capacitor CP41. Capacitor CP41 supplies power to micro-controller IR01 associated circuitries and charges up capacitor CP05 through a resistor RP85. The current flowing through resistors RP85 and RP16 to turn on transistor TP06 is relatively small. Since the major current load, that is the base drive of transistor TP10 is eliminated, capacitor CP05 can be made large to store high amounts of energy and yet be fully charged up before micro-controller IR01 completes its power up routine.

It is desirable to charge up capacitor CP05 to a sufficient high level well before micro-controller IR01 is properly powered up and ready to respond to user commands. When the user turns on the set from STAND-BY to RUN mode, transistors TP12 and TP11 are turned on and a train of pulses will appear at the base of transistor TP05. This train of pulses will alternately switch transistor TP05 on and off. When transistor TP05 turns on. transistor TP06 will be turned off and vice versa.

The turning off of transistor TP06 will cause current to flow via transistor TP11 and resistor RF67 to turn on transistor TP09 and turn off transistor TP13. Current then flows through resistors RP87 and RP23 and through transistor TP09 to turn on transistor TP10.

During the first few cycles of pulse train US1 appearing at the base of transistor TP05, the major energy source that provides the base drive current of transistor TP10 comes from the stored energy in capacitor CP05. Therefore, it is important that capacitor CP05 is fully charged up and has stored sufficient energy before pulse train US1 appears at the base of transistor TP05. Thus, capacitor CP05 is preferably fully charged with sufficient amounts of energy before the power supply turns on. If capacitor CP05 were not fully charged or had not stored sufficient energy when the power supply is turned on, there will be insufficient energy to provide the base drive current which flows via resistors RP87 and RP23, diodes DP16, DP15 and DP21 and inductor LP02 to turn on power transistor TP10. In this case, transistor TP10 might not have operated in saturation mode when transistor TP09 is turned on. The result is that transistor TP10 could have been damaged.

The problem of insufficient base drive current is overcome during power supply start-up by the ways described below. Firstly, a sufficient time delay is provided from the plugging in of the mains supply voltage and the time RUN mode operation begins. This allows capacitor CP05 to be fully charged before it is required to supply the base current for transistor TP10. Secondly, capacitor CP05 is charged continuously during the STAND-BY mode when the mains supply voltage is plugged in. Hence, capacitor CP05 can react immediately to supply the energy necessary to start-up the power supply when the power supply is turned on. Thirdly, sufficient current is provided to charge up capacitor CP05 by limiting the number of loads coupled across capacitor CP05. This is mainly achieved by cutting off the current supplied to the base drive of transistor TP10 during STAND-BY mode. Fourthly, a large capacitance such as 470 μF is used for capacitor CP05 to store sufficient energy.

Figure 2:
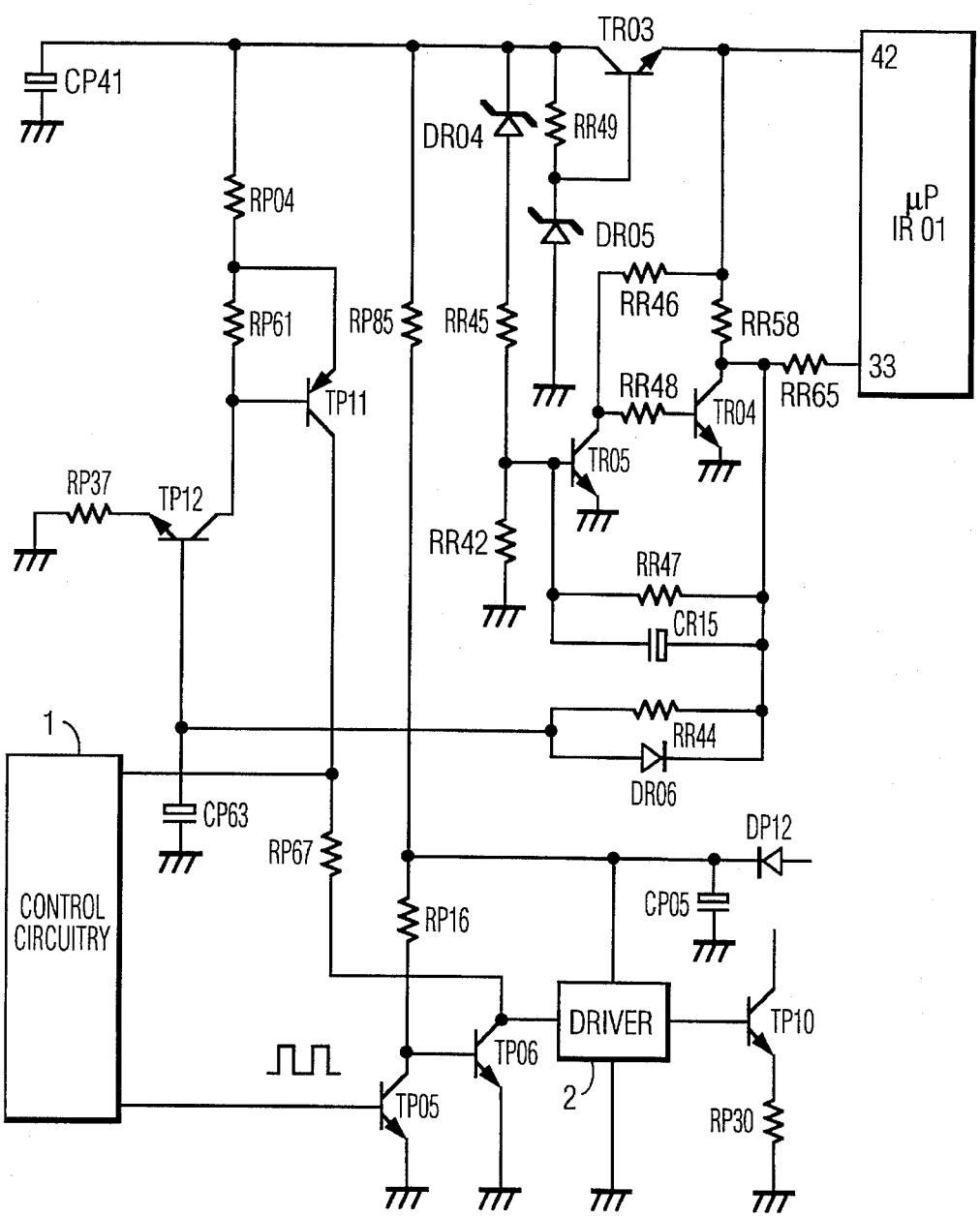
FIG. 2 illustrates a portion of the power supply of FIG. 1 that provides for a proper interrupt of the micro-controller operation and under-voltage protection.

FIG. 2 shows a second portion of FIG. 1 with an arrangement for proper interrupt of micro-controller IR01. In STAND-BY or normal RUN mode operation, if the voltage across capacitor CP41 drops due to some faults, the voltage at the emitter of transistor TR03 will also drop when the voltage across the capacitor CP41 falls below the voltage necessary to maintain the breakdown voltage of a zener diode DR05. The voltage at the output of the emitter is coupled to power supply pin 42 of micro-controller IR01. This voltage should be maintained between 4.5 volts to 5.5 volts for proper operation of micro-controller IR01. Micro-controller IR01 should cease all program execution before the supply voltage at pin 42 of micro-controller IR01 drops below 4.5 volts. This is done by pulling a reset pin 33 of micro-controller IR01 from the initial HIGH to LOW level.

When the voltage across capacitor CP41 falls to about 6.0 volts, the voltage at pin 42 of micro-controller IR01 is still 5 volts but a transistor TR05 will be turned off. This is because of insufficient current flowing through a zener diode DR04 and a resistor RR45 and insufficient feedback current via resistors RR58 and RR47 to turn on transistor TR05. When transistor TR05 turns off, current will flow via resistors RR46 and RR48 to turn on transistor TR04. This, in turn, pulls a reset pin 33 of micro-controller IR01 to the LOW state because it is coupled to the collector of transistor TR04 via a resistor RR65. When reset pin 33 of micro-controller IR01 is pulled low, micro-controller IR01 will stop all command executions, i.e., micro-controller goes to RESET mode operation.

With the above mentioned feature this arrangement can be used as an under voltage protection. When transistor TR04 is turned on, a capacitor CP63 coupled to the base of transistor TP12 discharges immediately via a diode DR06 and transistor TR04 to ground. When this occurs, transistor TP12 will be turned off. The turning off of transistor TP12 prevents the train of pulses from appearing at the base of transistor TP05 causing transistor TP05 to be continuously in the OFF state. Transistor TP06 will then be turned on by the current flowing via resistors RP85 and RP16. When transistor TP06 is at the ON state, no base drive current is supplied to transistor TP10. This effectively shuts down the power supply. This under voltage protection is useful to detect faults that cause the voltage across capacitor CP41 to drop. This feature is especially important when a fault occurs while the power supply is in the RUN mode.

A fault may greatly reduce the current flowing, during the RUN mode, through a diode DP12. Diode DP12 is coupled to a tap of transformer Tr of FIG. 1, in a manner now shown. Therefore, capacitor CP05 is unable to be charged up through this path. However, a current which is larger than normal will flow via resistor RP85 to charge up capacitor CP05 and provide the base drive current of transistor TP10. This will cause the voltage across capacitor CP41 to drop. When the voltage across capacitor CP41 drops to 6 volts, the power supply will shut down as described above. This shutdown is necessary to ensure that transistor TP10 is driven only when capacitor CP05 has sufficient voltage to drive transistor TP10 to saturation. If the shutdown did not occur, insufficient base drive could have occurred and transistor TP10 could have been damaged.

Figure 3:
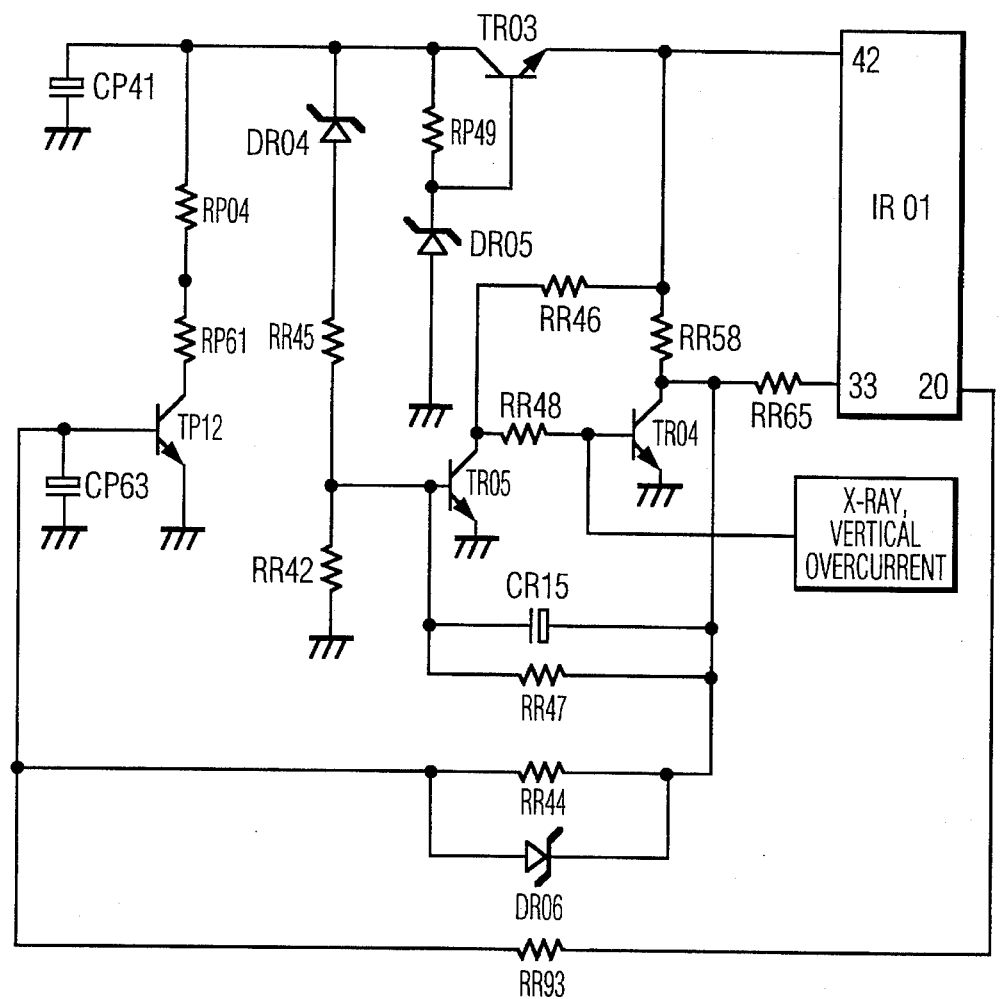
FIG. 3 illustrates a portion of the power supply of FIG. 1. that provides a delayed start up when the power supply is turned on from STAND-BY to RUN mode.

FIG. 3 shows a portion of the SMPS of FIGS. 1 and 2 with delayed start up when the power supply is switched from STAND-BY to RUN mode. When the television set is turned off from RUN to STAND-BY mode, pin 20 of micro-controller IR01 switches from HIGH to LOW. Capacitor CP63 will then discharge via a resistor RR93. Therefore, transistor TP12 will turn OFF. With transistor TP12 in the OFF state, there will be no train of pulses US1 at the base of the transistor TP05 causing transistor TP05 to be continuously turned off. With transistor TP05 in the OFF state, transistor TP06 is turned on and there is no base drive current to transistor TP10. The power supply is, therefore, turned off.

When the set is turned on from STAND-BY to RUN mode, pin 20 of micro-controller IR01 will be HIGH. However, the train of pulses US1 will not appear immediately at the base of transistor TP05 to turn on the power supply as long as capacitor CP63 is not charged to a voltage level sufficient to turn on transistor TP12. Capacitor CP63 will charge up via resistors RR58 and RR44 according to the time constant which is equal to the sum of the resistances of resistors RR58 and RR44 times the capacitance of capacitor CP63. This slow charging of capacitor CP63 delays the turning on of transistor TP12. As a result, the starting up of the power supply is delayed to provide the necessary time for capacitor CP05 to recharge. This feature is especially important when the user presses the ON/OFF key repeatedly. If this function were absent, the power supply would turn on too often without providing sufficient time for capacitor CP05 to charge up. This could result in insufficient base drive to transistor TP10 and could result in catastrophic failure of the power supply.

FIG. 3 incorporates protection arrangements that provide sufficient delay time when X-ray, vertical or over-current protection is activated. When any of such protection arrangements is activated, transistor TR04 is turned on. Reset pin 33 of micro-controller IR01 will be pulled from HIGH to LOW state immediately because this pin is coupled to the collector of transistor TR04 via resistor RR65. This instantaneous change from HIGH level to LOW level will cause micro-controller IR01 to suspend further execution of instructions immediately. At the same time, the positive terminal of capacitor CR15 is coupled to ground. The negative terminal of capacitor CR15 then becomes negative or −5 volts with respect to the ground potential. This −5 volts reverse biases transistor TR05 and switches it off. Current then flows via resistors RR46 and RR48 to further maintain transistor TR04 turned on. Capacitor CP63 will discharge immediately via the path of diode DR06 and transistor TR04 to ground. Transistor TP12 then switches to the OFF state and the train of pulses US1 disappears from the base of transistor TP05. This shuts off the power supply.

Thus, the power supply will shut off immediately when a fault such as X-ray, vertical deflection failure or over current protection occurs. When the power supply is turned off, the fault condition will disappear. However, transistor TR04 will remain ON for a while because of the current flowing via resistors RR46 and RR48. Also, transistor TR05 remains in the OFF state until the negative terminal of the capacitor CR15 is charged up from −5 volts to about 0.6 volts via diode DR04 and resistor RR45 to turn transistor TR05 on again. Once transistor TR05 is turned on, transistor TR04 will be turned off. Current will then flow to charge up capacitor CP63 via resistors RR58 and RR44. When capacitor CP63 is charged up sufficiently, transistor TP12 will turn on and pulse train US1 will reappear at the base of transistor TP05. This turns on the power supply. When the power supply is restarted, a fault condition may again be detected if the fault has not been eliminated yet and the cycle of shutdown and restart occurs again. As mentioned above, the shutdown is immediate; whereas, the restart is delayed. This continual "hiccup" process of the power supply with quick shutdown and long delay before restart is desirable for the overall reliability of the television set and safety of the consumer.

In a first example, assume that, the X-radiation protection is activated. This circuit will allow the television set to shutdown immediately to prevent the user from being exposed to excessive radiation. A long delay before start-up allows capacitor CP05 to charge up sufficiently to ensure the reliability of the power supply as well as to reduce the amount of radiation. Once the power supply is restarted without the fault being eliminated, it will again go to shutdown immediately. During the hiccuping sequence, no raster will appear on the television screen. Hence, the radiation is greatly reduced.

In a second example, assume that the vertical protection is activated. This circuit allows the immediate shutdown of the television set and prevents a greater damage to the television set. During the "hiccuping" process, and before the fault is eliminated, capacitor CP05 is fully charged which prevents further damages to the set.

In a third example, assume that the over current protection is activated. This circuit allows the immediate shutdown of the power supply and hence limits any damages to the television set. During the "hiccuping" process and before the fault is eliminated, the long turn off time that occurs before the power supply restarts allows capacitor CP05 to be sufficiently charged up and reduces the stress on transistor TP10.

Figure 4:
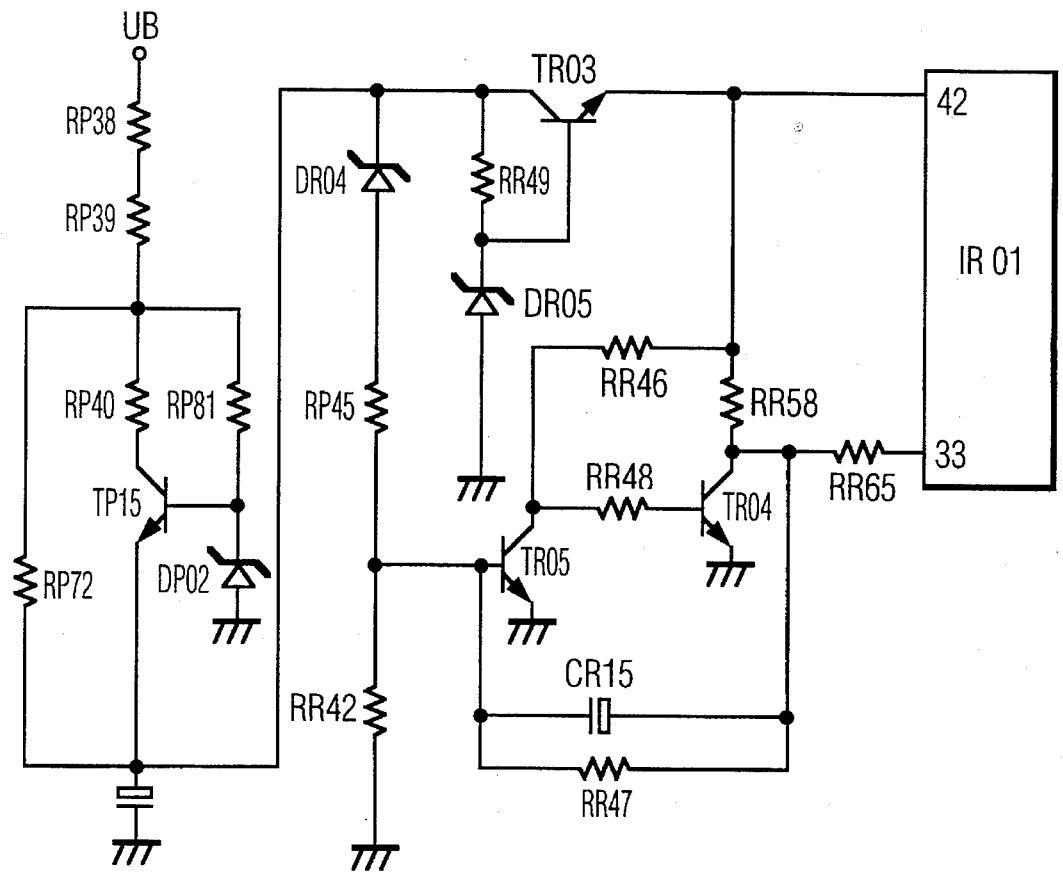
FIG. 4 illustrates the way a proper power up sequence of the micro-controller is obtained in the arrangement of FIGS. 1–3.

FIG. 4 illustrates a portion of the SMPS of FIGS. 1–3 for explanation of proper power up of micro-controller IR01. When the television set is plugged into the mains supply voltage, capacitor CP41 will charge-up via the resistor RP38, RP39, RP40, RP72 and transistor TP15. During the charging up interval, current will flow via resistor RR49 and zener diode DR05 to ground. This turns on transistor TR03 and the voltage at the emitter of transistor TR03 rises to 5 volts. During this time, current will also flow through resistor RR46 and RR48 to turn on transistor TR04. The reset pin 33 of micro-controller IR01 is then at the LOW state because it is coupled to the collector of transistor TR04 via resistor RR65. When the voltage across capacitor CP41 becomes 7.6 volts, the voltage at power supply pin 42 of micro-controller IR01 which is coupled to the emitter of transistor TR03 has stabilized at 5 volts. This is required since micro-controller IR01 is designed to operate with the supply voltage at pin 42 between 4.5 volts and 5.5 volts. When the voltage in capacitor CP41 reaches 7.6 volts, sufficient current will flow via zener diode DR04 and resistor RR45 to charge up capacitor CR15. Capacitor CR15 has its positive terminal coupled to the collector of transistor TR04 which is at the ON state. Therefore, capacitor CR15 will have its negative terminal charged to about 0.6 volts and will turn on transistor TR05. When transistor TR05 is turned on, the current flowing through resistor RR48 is shunted to ground via transistor TR05. Consequently, the base current through the transistor TR04 is cut off and turns off transistor TR04. Current then flows through resistor RR58 to charge up the positive terminal of capacitor CR15 with a time constant equal to the product of the resistance of resistor RR58 and the capacitance of capacitor CR15. Since reset pin 33 of micro-controller IR01 is coupled to the positive terminal of capacitor CR15 via resistor RR65, the reset voltage will also rise gradually and will reach 5 volts. This gradual rise time is necessary for the proper power-up of micro-controller IR01. After this, the micro-controller will start to function and accept user commands.

The components shown in FIGS. 1–4 have the following values:
DP16—Diode type, 1N4001
DP21—Diode type, 1N4001
DP06—Diode type, 1N4148
DP15—Diode type, 1N4001
DP12—Diode type, BA157
DR04—Zener diode, ZPD6V8
DR05—Zener diode, ZPD5V6
CP05—Capacitor, 470 µF
CP63—Capacitor, 47 µF
CP41—Capacitor, 1000 µF
CR15—Capacitor, 4.7 µF
RP38—Resistor, 680 ohms
RP39—Resistor, 220 ohms
RP40—Resistor, 680 ohms
RP72—Resistor, 12 ohms
RR45—Resistor, 3.3 ohms
RP76—Resistor, 1.2 ohms
RR93—Resistor, 680 ohms
RP87—Resistor, 4.7 ohms
RP23—Resistor, 5.6 ohms
P85—Resistor, 220 ohms
RRP16—Resistor, 10 ohms
RR49—Resistor, 1.2 kohms
RR46—Resistor, 10 kohms
RR58—Resistor, 3.3 kohms
RR48—Resistor, 10 kohms
RR65—Resistor, 10 kohms
RR47—Resistor, 33 kohms
RP61—Resistor, 3.3 kohms
RR44—Resistor, 8.2 kohms
TP15—Transistor, S1836
TP11—Transistor, BC558C
TP12—Transistor, BC548C
TP05—Transistor, BC548C
TP06—Transistor, BC548C
TP09—Transistor, BC337
TP13—Transistor, BD4340
TP10—Transistor, S2000A3
TP03—Transistor, BC548B
TP04—Transistor, BC548C
TP05—Transistor, BC548C
LP02—Inductor 6 µH
IR01—Micro controller
. . . ST6497

What is claimed is:

1. A switch mode power supply comprising:

a power controlling transistor having a current responsive control electrode for switching the transistor to an "on" state when said current is above a first threshold value and an "off" state when said current is below a second threshold value, a micro-controller for switching the operation of said power supply between a power-off mode, a stand-by mode and a normal run mode;

control circuitry having an output whose voltage level controls said control electrode, the level of said output being low when the power supply is in the power-off mode or in the standby mode so that the current received by said control electrode is below the second threshold current, said output providing a pulsed train when the power supply is in said run mode, said pulsed train switching periodically on and off said current flowing in said control electrode, said control circuitry having an input responsive to a switching signal generated by said micro-controller and having first and second states where in said first state said pulse train is disabled and in said second state said pulse train is enabled, a circuit responsive to said pulse train and coupling and decoupling said control electrode respectively to and from a current source in response to the level of the pulse train, a first capacitor coupled to a power supply terminal of said circuit responsive to said pulse train for storing a charge supplied via a charging path to provide a supply voltage for energizing said circuit responsive to said pulse train, and circuit means for disabling said control circuit if said first capacitor is not fully charged when said power supply is switched into the run mode.

2. A power supply according to claim 1 wherein said first capacitor is continuously charged during said standby mode.

3. A power supply according to claim 1 further comprising means for delaying the occurrence of said switching signal from a time when said micro-controller initiates said run mode operation.

4. A power supply according to claim 1 further comprising means for delaying from a time when said micro-controller is ready to respond to a power-on command until a second capacitor that supplies power to said micro-controller is fully charged.

5. A power supply according to claim 1 wherein said first capacitor has a value that is at least one hundred microfarads.

6. The switch mode power supply according to claim 1 wherein said first state is a low state which is controlled through a charge of a second capacitor that will discharge into said first capacitor if said first capacitor is not fully charged.

7. A switch mode power supply comprising:

a power controlling transistor having a current responsive control electrode for switching the transistor to an "on" state when said current is above a first threshold value and an "off" state when said current is below a second threshold value, a micro-controller for switching the operation of said power supply between a power-off mode, a stand-by mode and a normal run mode;

control circuitry having an output whose voltage level controls said control electrode, the level of said output being low when the power supply is in the power-off mode or in the standby mode so that the current received by said control electrode is below the second threshold current, said output providing a pulsed train when the power supply is in said run mode, said pulsed train switching periodically on and off said current flowing in said control electrode, said control circuitry having an input responsive to a switching signal generated by said micro-controller and having first and second states where in said first state said pulse train is disabled and in said second state said pulse train is enabled, a circuit responsive to said pulse train and coupling and decoupling said control electrode respectively to and from a current source in response to the level of the pulse train, a first capacitor coupled to a power supply terminal of said circuit responsive to said pulse train for storing a charge supplied via a charging path to provide a supply voltage for energizing said circuit responsive to said pulse train, and circuit means for disabling said control circuit if said first capacitor is not fully charged when said power supply is switched into the run mode, said first state being a low state and which is controlled through a charge of a second capacitor that will discharge into said first capacitor if said first capacitor is not fully charged.

8. A power supply according to claim 7 wherein said first capacitor is continuously charged during said standby mode.

9. A power supply according to claim 7 further comprising means for delaying the occurrence of said switching signal from a time when said micro-controller initiates said run mode operation.

10. A power supply according to claim 7 wherein said first capacitor has a value that is at least one hundred microfarads.

* * * * *